United States Patent [19]

Ishida et al.

[11] Patent Number: 5,109,331

[45] Date of Patent: Apr. 28, 1992

[54] COMPILING A SOURCE PROGRAM BY ANALYZING A SUBSCRIPT OF AN ARRAY INCLUDED IN A LOOP PROCESSING OF A COMPUTER

[75] Inventors: Kazuhisa Ishida, Yokohama; Yasusi Kanada, Tokyo; Shizuo Gotou, Hachioji, all of Japan

[73] Assignee: Hitachi, Ltd., Tokyo, Japan

[21] Appl. No.: 97,196

[22] Filed: Sep. 16, 1987

[30] Foreign Application Priority Data

Sep. 19, 1986 [JP] Japan ............................ 61-219543

[51] Int. Cl.⁵ .......................... G06F 5/00; G06F 9/30
[52] U.S. Cl. .................................. 395/375; 364/262; 364/280.5; 364/946.8; 364/973; 364/DIG. 1; 364/DIG. 2
[58] Field of Search ... 364/200 MS File, 900 MS File, 364/300

[56] References Cited

U.S. PATENT DOCUMENTS

| | | | |
|---|---|---|---|
| 4,646,256 | 2/1987 | Bracewell | 364/725 |
| 4,710,872 | 12/1987 | Scarborough | 364/300 |
| 4,744,028 | 5/1988 | Karmarkar | 364/402 |
| 4,773,007 | 9/1988 | Kanada et al. | 364/900 |
| 4,797,729 | 1/1989 | Tsai | 358/13 |

OTHER PUBLICATIONS

"The compilation of Loop Induction Expressions", Richard L. Sites, ACM *Transaction on Programming Languages and Systems*, vol. 1, No. 1, Jul. 1979, pp. 50–57.

"Compilers Principles, Techniques, and Tools", A. Aho et al., Addison-Wesley, 1986, pp. 585–648.

"Dependence Graphs and Compiler Optimizations", Kuck et al., 8th *Conference on Principles of Programming Languages*, ACM (1981), pp. 207–218.

"Parallel Processor Architecture-A Survey", D. J. Kuck, 1975 *Sagamore Computer Conference on Parallel Processing*, pp. 15–39.

*Primary Examiner*—Thomas C. Lee
*Assistant Examiner*—Ayni Mohamed
*Attorney, Agent, or Firm*—Fay, Sharpe, Beall, Fagan, Minnich & McKee

[57] ABSTRACT

An induction variable contained in a definition formula for a variable in a loop is analyzed for a source program to be compiled in order to optimize the execution of the program. The induction variable is represented by a standard form expressed by a value (initial value) in a first interation of the loop and a value (increment) which is incremented for each iteration of the loop, and a subscript in an array in the loop is represented by linear coupling to the standard form. Whether the subscript assumes the same value in one or more iterations of the loop for a pair of arrays in the loop is checked to analyze the independency and dependency of the arrays in the loop.

6 Claims, 6 Drawing Sheets

F I G. 1
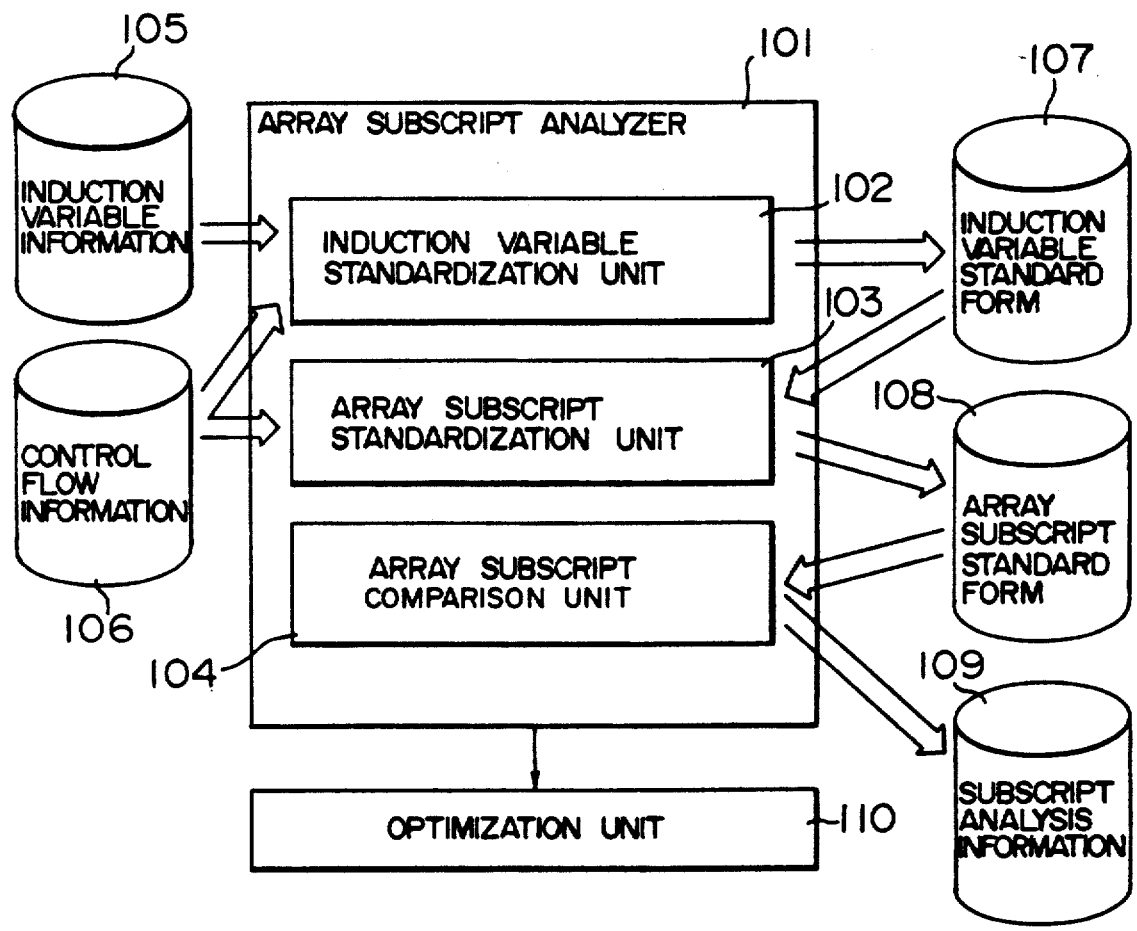

FIG. 5

```
┌─ LOOP L
│   ///////  ----- AREA X₀
│   j = j + d₁
│   ///////  ----- AREA X₁
│   j = j + d₂
│       ⋮
│   j = j + dₚ
│   ///////  ----- AREA Xₚ
└─
```

COMPILING A SOURCE PROGRAM BY ANALYZING A SUBSCRIPT OF AN ARRAY INCLUDED IN A LOOP PROCESSING OF A COMPUTER

BACKGROUND OF INVENTION

1. Field of the Invention

The present invention relates to a compiler for a computer language, and more particularly to a method for efficiently utilizing a hardware of the computer. Further more particularly, it relates to analysis of subscripts of an array in loop processing for utilizing a vector function of the computer and increasing a processing speed by reutilization of an operation result.

2. Description of Related Art

A compiler analyzes a source program and compiles it to an object program in an execution form by adding to the source program a process to improve a utilization efficiency in prosecution of the program (which is called an optimization process). In the prior art, the above process is carried out when a subscript (j) of an array (A(j)) described in a DO loop in the source program is represented by a single definition, but the above process cannot be carried out when two or more definitions are included. Such a process is described in Journal of Information Processing Society of Japan, Vol. 24, No. 2, pages 238-248 (1983).

However, in order to enhance the efficiency of the computer, it is necessary to carry out the optimization process when even two or more definitions are included.

SUMMARY OF THE INVENTION

It is an object of the present invention to allow further optimization by more accurately analyzing the subscripts of the array to obtain an object program of a shorter execution time.

The above object is achieved in a compiler by (1) expressing an induction variable by a combination of a value in a first iteration of a loop (initial value) and a value which is incremented for each loop iteration (increment) (the expression expressed by the initial value and the increment is called a standard form), (2) sequentially reading subscripts used by the array in the loop and change all induction variables in subscripts to the standard form prepared in (1) above (making a standard form subscript), and (3) checking whether the same array element (Ai) is to be referred or not in one iteration of the loop and in different iterations of the loop between the references of the array (A) in the multiple loop, by using the standard form subscripts prepared in (2) above.

BRIEF DESCRIPTION OF THE DRAWINGS

FIG. 1 shows an array subscript analyzer of the present invention;

FIG. 5 illustrates the induction variable standardization process;

FIG. 7 illustrates problems encountered in a conventional analysis method.

DESCRIPTION OF THE PREFERRED EMBODIMENTS

Figure 2:
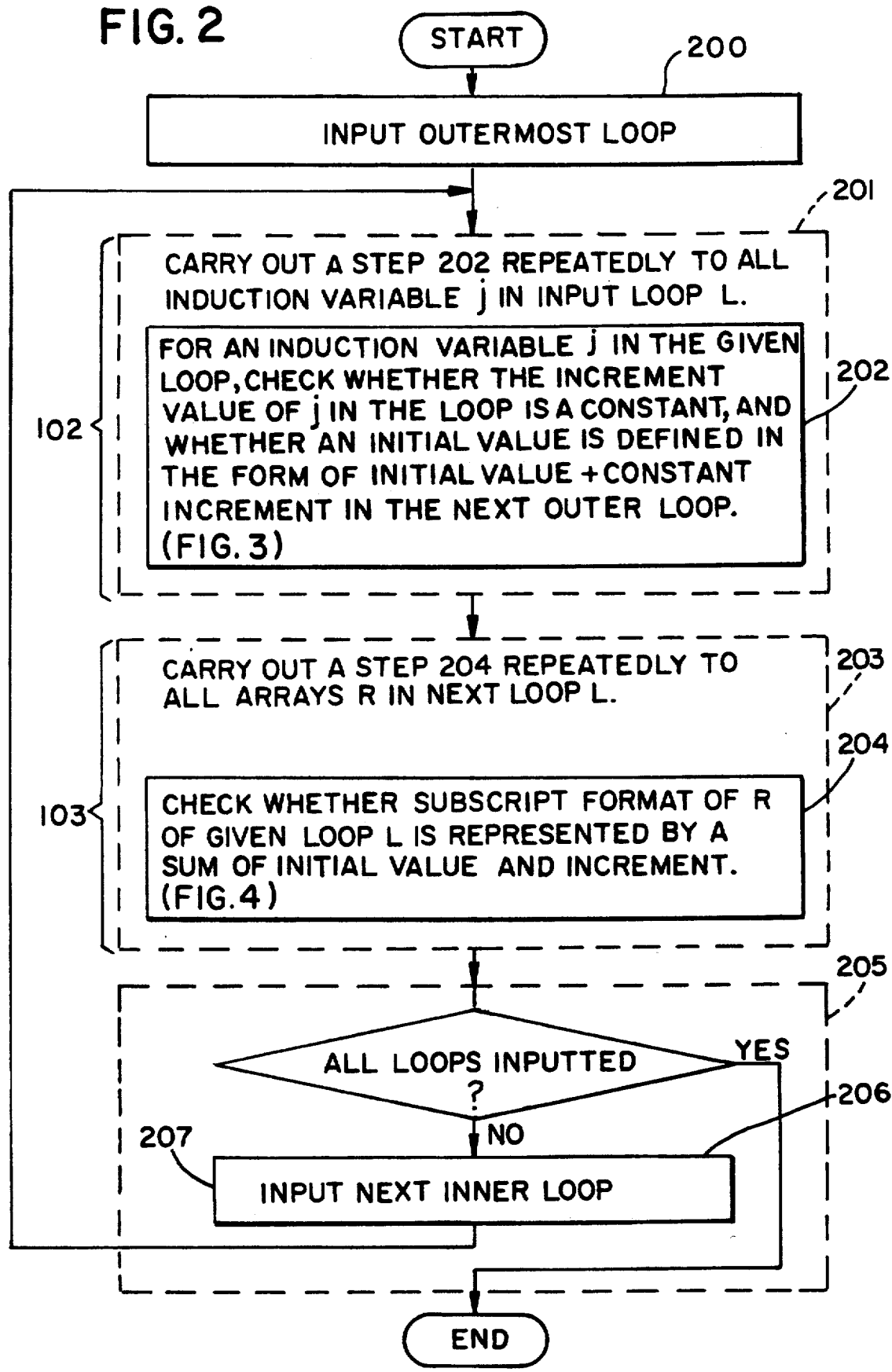
FIG. 2 shows a flow chart of an induction variable standardization unit and an array subscript standardization unit.

FIG. 7 shows an example of a source program handled in the present invention. It iterates N times the execution from "DO" to "CONTINUE" in line 10, and "j=j+1" indicates that j is incremented by one at that time. The value of A(j) is defined at d1. A variable (j) contained in the right side of a definition formula for the subscript is called an induction variable. When "j=j+2", the value of j updated by "j=j+1" is incremented by two. At u1, A(j) is used. When "j=j-2", the value of j updated by "j=j+2" is decremented by two. That is, the value returns to the one updated by "j=j+1". At u2, A(j) is again used.

In such a DO loop, there are a plurality of definitions for the subscript and the array A(j) is used a plurality of times in one circulation of the loop. In the prior art, the optimization process cannot be carried out because there are a plurality of definitions for the subscript j. In the above example, A(j) defined at d1 and A(j) used at u2 are identical. Accordingly, the execution speed of the program will be increased if A(j) at d1 is latched in a register and used at u2. As described above, there is room for optimization processing.

FIG. 1 shows one embodiment of an array subscript analysis process of the present invention.

An array subscript analyzer 101 comprises three units, an induction variable standardization unit 102, an array subscript standardization unit 103 and an array subscript comparison unit 104. The induction variable standardization unit 102 receives induction variable information 105 and control flow information 106 and produces an induction variable standard form 107. The array subscript standardization unit 103 receives the control flow information 106 and the induction variable standard form 107 and produces an array subscript standard form 108. The array subscript comparison unit 104 receives the array subscript standard form 108 and produces array subscript analysis information 109 which is an output of the array subscript analyzer 101.

An optimization unit 110 receives the above output and converts the source program to optimized object code so that it executes processing by effectively utilizing the computer function. The optimization unit 110 is realized by the method shown, for example, in "Dependence Graphs and Compiler Optimization", Kuck, et al., 8th Conference on Principles of Programming Languages, ACM (1981), pp. 207-218.

Prior to the explanation of a specific content of the process, a standard induction variable, the standardization of a formula in a program and a standard form are explained.

(1) Standard induction variable

The standard induction variable is an induction variable having an initial value of 0 and an increment of 1. There is one provided for each loop and represented by $I_L$.

(2) Standardization and standard form

The standardization is to express a formula representing a subscript in an array in a program by linear formula of the standard induction variable which has constant coefficient. The expression by the standardization is called the standard form. The standard form is usually expressed by $$C_0 + \Sigma_L: \text{all related loops } C_L \times I_L$$

where $C_0$ and $C_L$ are constants and $I_L$ is the standard induction variable of the loop L. (It indicates a series having an initial value $C_0$ and a common difference $C_L$).

The flow chart of FIG. 2 shows operation of the induction variable standardization unit 102 and the array subscript standardization unit 103. The loop is usually a multi-loop comprising an outer loop and an inner loop. The outer loop is first inputted under the control of the array subscript analyzer 101 (200). In step 201, a standardization process 202 is carried out for all induction variables j in the input loop L. The step 202 is implemented by a flow chart shown in FIG. 3. After the induction variables of step 201 have been standardized, the definition formulas of the subscripts in all arrays R in the input loop L are standardized in step 204. Step 204 is implemented by the flow chart shown in FIG. 4. In step 205, one inner loop is inputted until the above process is carried out for all loops, and the above process is repeated in steps 206 and 207.

Figure 3:
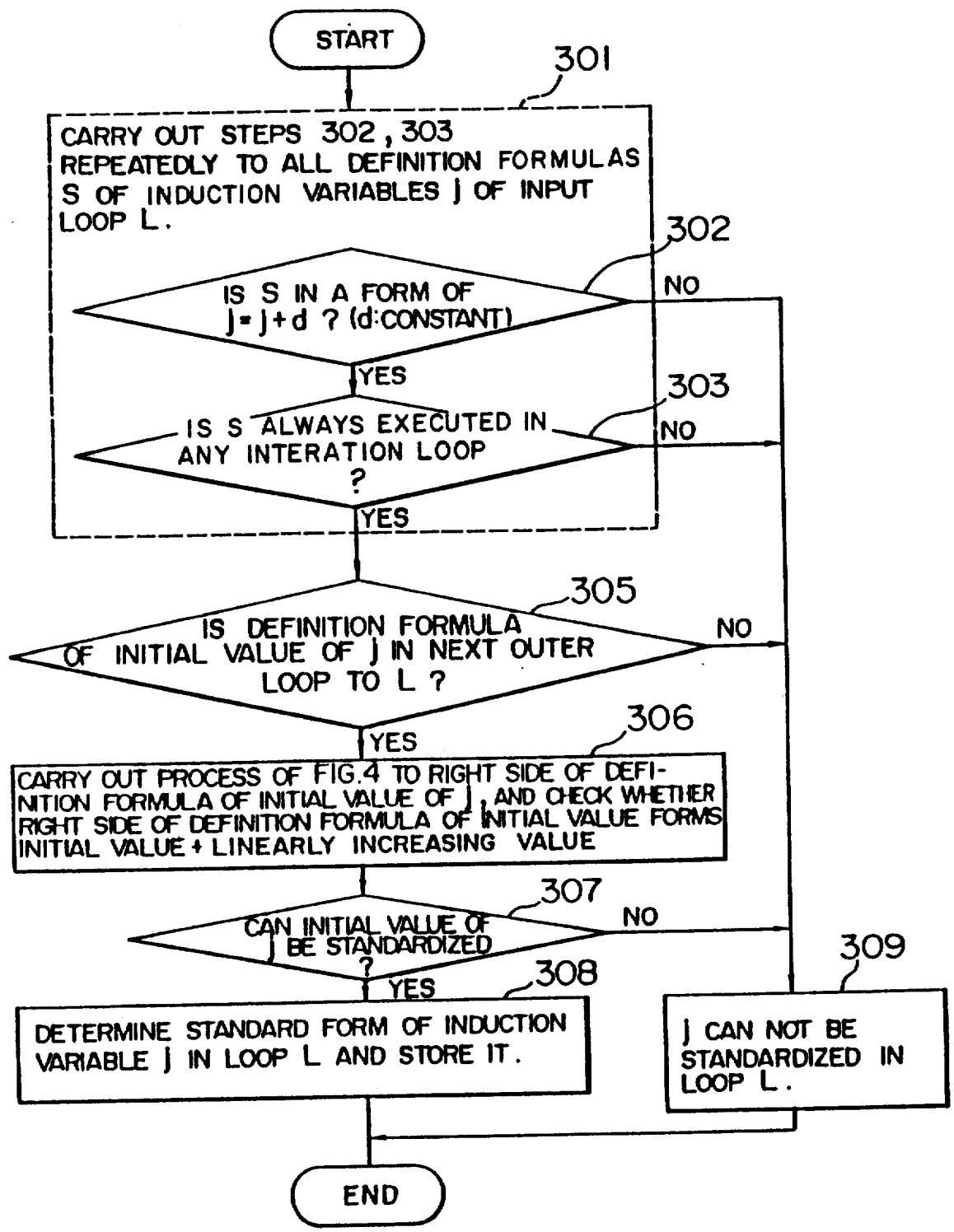
FIG. 3 shows a flow chart of an induction variable standardization process.
Figure 4:
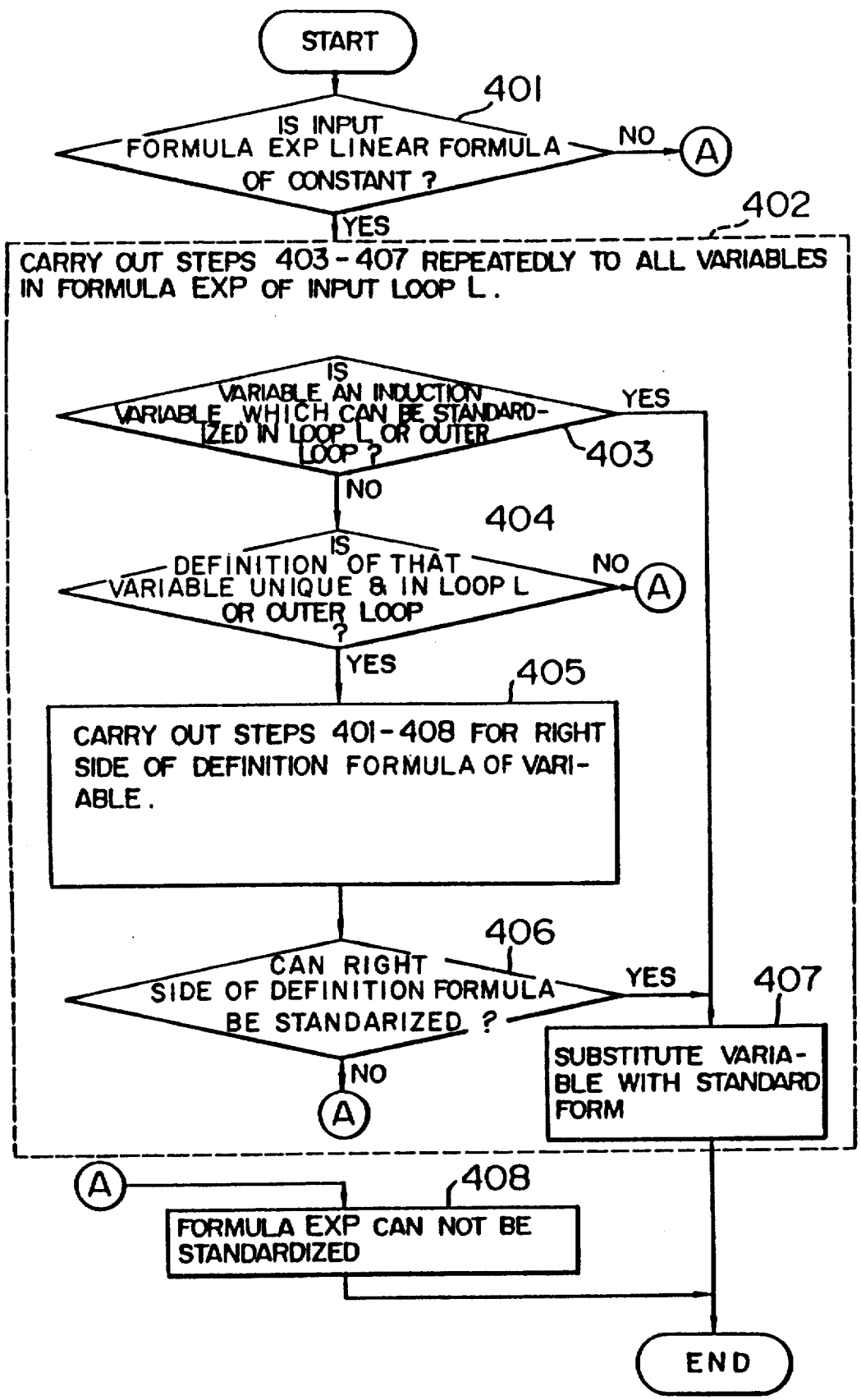
FIG. 4 shows a flow chart of a standardization process for a formula in a loop.

The flow chart of FIG. 3 shows the standardization step 201 in FIG. 2 for the induction variable j of the loop L. In step 301, steps 302, 303 and 304 are repeated for all definition formulas S of the induction variables j of the input loop L. Step 302 is a decision clause which results in true (YES) if the definition formula S of the induction variable j is in the form of $j = j + d$ (where d is a constant). If the decision in step 302 is true (YES), step 303 is carried out, and if it is false (NO), the process proceeds to step 309 where the decision is made that the induction variable j cannot be standardized in the loop L, and the process terminates. Step 303 is a decision clause which results in true if the definition formula S of the induction variable j is not in a conditional branch instruction in the loop L. If decision in the step 303 is true, step 301 is repeated for other definition formula S, and if it is false, the process proceeds to step 309 where the decision is made that the induction variable j cannot be standardized and the process is terminated. Step 305 is a decision clause which results in true if a formula which defines the initial value of j is immediately in front of the loop. (For example, $j = 0$ in FIG. 7. It is next outer to the loop). If it is immediately in front of the loop, the initial value is used as it is, and if it is in front of a next outer loop, the defined initial value is changed by the outer loop. As a result, the initial value is not a constant and the induction variable cannot be standardized. If the decision in step 305 is false, the decision is made in step 309 that the induction variable j cannot be standardized and the process is terminated. In step 306, a process shown in FIG. 4 is carried out to the right side of a formula which defines the initial value of j. Step 307 is a decision clause which results in true if the right side of the definition formula of the initial value of j can be standardized in a next outer loop of L. If the decision in step 307 is false, the decision is made in step 309 that the induction variable j cannot be standardized in the loop L and the process is terminated.

In step 308, a standard form of the induction variable j is determined. By dividing the loop L into areas $X_0, X_1, \ldots, X_p$ separated by the definition formulas $j = j + d_1, j = j + d_2, \ldots, j = j + d_p$ (where $d_1, d_2, \ldots, d_p$ are constants) in the loop L of the induction variable j as shown in FIG. 5, the standard form of the induction variable in the area $X_i$ is expressed by $$j_0 + \Sigma_{j=1, i-1} d_j + (\Sigma_{i=1, p} d_j) I_L$$

where $j_0$ is a standard form of the right side of the definition formula of the initial value of the induction variable j in the next outer loop of the loop L.

The flow chart of FIG. 4 shows a process which receives a formula (EXP) representing a subscript in a program and carries out step 204 of FIG. 2 and step 306 of FIG. 3. Step 401 is a decision clause which results in true when the formula EXP is expressed by a linear formula of a constant coefficient. If the decision in step 401 is true, step 402 is carried out, and if it is false, the decision is made in step 408 that the formula EXP cannot be standardized in the loop L, and the process is terminated. Step 402 repeatedly carries out steps 403–407 for all variables in the formula EXP of the input loop L. When step 402 has been completed, the formula EXP is standardized in the loop L and the standard form is outputted. Step 403 is a decision clause which results in true if the variable in the formula EXP is an induction variable which can be standardized in the loop L or the next outer loop. If the decision in step 403 is true, the process proceeds to step 407 where the variable is substituted by the standard form of the induction variable in the loop L determined in step 201. If the decision in the step 403 is false, step 404 is carried out. Step 404 is the decision clause which results in true if the definition formula which defines the variable in the formula EXP is single and in the loop L or the next outer loop. If the decision in step 404 is false, the decision is made in step 408 that the formula EXP cannot be standardized in the loop L and the process is terminated. If the decision in step 404 is true, step 405 is carried out. Step 405 carries out steps 401 to 408 of FIG. 4 to the right side of the definition formula which defines the value used in the variable in the formula EXP. Step 405 produces information indicating whether the right side of the definition formula which defines the value used in the variable in the formula EXP can be standardized in the loop to which the definition formula belongs, and if it can be standardized, produces a standard form thereof. Step 401 is the decision clause which results in true when step 405 determines that it can be standardized. If the decision in step 406 is true, the variable is substituted in step 407 by the standard form produced in step 406. If the decision in step 406 is false, the decision is made in step 408 that the formula EXP cannot be standardized in the loop L, and the process is terminated.

The implementation of the induction variable standardization unit 102 and the array subscript standardization unit 103 of FIG. 1 have been described.

The implementation of the array subscript comparison unit 104 of FIG. 1 will now explained with reference to FIG. 6.

The inputs and outputs of the array subscript comparison unit 104 are explained first. The inputs are an array subscript standard form U for u and an array subscript standard form V for v produced by the array subscript standardization unit 103, where u and v are occurrences of an array A(j) in a multi-loop to be analyzed, a loop $L_0$ which contains both occurrences u and v of the array (which is called an object loop) and a non-negative integer n (which is called number of times of repetition of object loop), and the outputs are five Boolean values, that is, Neceq, Indep, Sindep, Poseq and Sposeq defined by (1)-(5) below.

(1) Neceq: It is true only when the value of U in the k-th iteration of the loop Lo is equal to the value of V in the (k+n)th iteration of the loop Lo, where k is a non-negative integer and n is 1, 2, . . . .

For example, if U is a series having an initial value 4 and a common difference 2 ($4+2\times I_L$) and V has an initial value 0 and a common difference 2 ($0+2\times I_L$), the value of U in the k-th iteration is equal to the value of V in the (k+2)th iteration.

(2) Indep: It is true only when the value of U in the k-th iteration of the loop Lo is different from the value of V in the (k+n)th iteration of the loop Lo.

It indicates that the values of U and V are independent from each other.

(3) Sindep: It is true only when the value of U in the k-th iteration of the loop Lo is different from the value of V in the (k+n+l)th iteration of the loop Lo, where k and l are non-negative integers and l changes from 1 to $l_1$.

This assures that there is no coincidence between U and V even if the numbers of times of repetition for U and V are different by at least ($n+l_1$).

(4) Poseq: It is true only when Indep is false.

(5) Sposeq: It is true only when Sindep is false.

In the following description, it is assumed that U and V are of linear standard form and expressed by $U = Co + \Sigma_L$: related loops $C_L \times I_L$ ($Co$, $C_L$: constant)
$V = C'o + \Sigma_L$: related loops $C'_L \times I_L$ ($C'o$, $C'_L$: constants)

where $I_L$ is a progression having an initial value 0 and a pitch 1.

An upper limit of the number of times of repetition of the loop L is given by $l_L$.

The operation of the array subscript comparison unit is explained by using the above standard forms and symbols (steps 501-514). In step 501, the standard induction variables and constants of U and V are compared to determine Neceq. Specifically, Neceq is true when the following conditions (a), (b) and (c) are met, and false if at least one of them is not met. (a) $Co = C'o + C'_{Lo} \times n$, (b) $C_L = C'_L$ for Lo and all outer loops L, (c) $C_L = C'_L = 0$ for all loops L other than the outer loops.

Step 502 is the decision clause for Neceq determined in step 501. When Neceq is true, Indep is rendered false, Sindep is rendered false, Poseq is rendered true and Sposeq is rendered true in step 510. If Neceq is false, step 503 is carried out. In step 503, a Diophantus equation Dioph is defined based on U and V and it is solved. The Diophantus equation Dioph is defined as follows.

The standard form V is converted to V' in accordance with the object loop $L_S$ and the number of times of repetition of the object loop.

$V = Co + C_{Lo} \times n +$
$\quad \Sigma_L$: Lo and related outer loops $C_L I'_L +$
$\quad \Sigma_L$: related loops other than outer loops
$\quad C_L I'_L$ where $I'_L$ is an integer variable which is independent of $I_L$ and varies between 0 and $l_{L-1}$. The Diophantus equation Dioph is defined by $U = V'$ The Diophantus equation Dioph can be solved by a method similar to an Euclidean algorithm (which is the method of finding the greatest divisor). When $I_L$ is represented by initial value 0+pitch (increment) $1 \times$iteration number n, the variable is n. The output in step 503 includes information indicating whether the Diophantus equation Dioph has a solution, and the solution if any. If there is a solution, it means that U and V have a coincident value. Step 504 is the decision clause which results in true when the Diophantus equation Dioph has a solution. If decision in the step 504 is false, step 511 is carried ut to render Indep true, and then step 507 is carried out. If the decision in step 504 is true, step 505 is carried out.

In step 505, a solution space of the Diophantus equation Dioph solved in step 503 is approximated. The approximation of the solution space of the Diophantus equation Dioph is carried out in two stages.

Stage 1: For the object loop Lo, $l'_{Lo}$ is substituted by $l_{Lo-n}$, and for other loops L, $l'_L$ is substituted by $l_{L-1}$. The solution space of the Diophantus equation Dioph is approximated by $0 \leq I_L \leq l'_L$ (L: all loops)

$0 \leq K'_L \leq l'_L$ (L other than Lo and outer loops)

Stage 2: It is assumed that the solutions of the Diophantus equation Dioph which are represented by linear coupling of constant of single integer variable parameter are $I_{L1}, I_{L2}, \ldots, I_{Lp}, I'_{L'1}, I'_{L'2}, \ldots, I'_{L'q}$ and they are expressed by $I_{Li} = \alpha_{Li} + \beta_{Li} t_{\gamma i}$ ($1 \leq i \leq p$)
$I'_{Li} = \alpha'_{L'i} + \beta'_{L'i} t'_{\gamma' i}$ ($1 \leq i \leq q$)

where $\alpha_{Li}$, $\beta_{Li}$, $\alpha'_{L'i}$, $\beta'_{L'i}$, $\gamma_i$ and $\gamma'_i$ are integer constants, $t_{\gamma i}$ and $t_{\gamma' i}$ are integer variable parameters, and p and q are numbers of solutions represented by one parameter.

Based on the approximation in the stage 1, the following simultaneous inequalities are defined.

$0 \leq \alpha_{Li} + \beta_{Li} t_{\gamma i} \leq l'_{Li}$ ($1 \leq i \leq p$)
$0 \leq \alpha'_{L'i} + \beta'_{L'i} t'_{\gamma' i} \leq l'_{L'i}$ ($1 \leq i \leq q$)

The above inequalities are solved within the integer range of $t_{\gamma i}$ and $t_{\gamma' i}$ to obtain solutions.

$t_{\gamma i}\min \leq t_{\gamma i} \leq t_{\gamma i}\max$ ($1 \leq i \leq p$)
$t_{\gamma' i}\min \leq t_{\gamma' i} \leq t_{\gamma' i}\max$ ($1 \leq i \leq q$)

For each loop L, $l_L$ min and $l_L$ max are defined in accordance with (i), (ii) and (iii) below.

(i) When there is an i which meets $L = L_i$:

$$l_L \min = \begin{cases} \alpha_{Li} + \beta_{Li} t_{\gamma i} \min & (\beta_{Li} \geq 0) \\ \alpha_{Li} + \beta_{Li} t_{\gamma i} \max & (\beta_{Li} < 0) \end{cases}$$

$$l_L \max = \begin{cases} \alpha_{Li} + \beta_{Li} t_{\gamma i} \max & (\beta_{Li} \geq 0) \\ \alpha_{Li} + \beta_{Li} t_{\gamma i} \min & (\beta_{Li} < 0) \end{cases}$$

(ii) When there is an i which meets $L = L'_i$:

$$l_L \min = \begin{cases} \alpha'_{L'i} + \beta'_{L'i} t_{\gamma' i} \min & (\beta'_{L'i} \geq 0) \\ \alpha'_{L'i} + \beta'_{L'i} t_{\gamma' i} \max & (\beta'_{L'i} < 0) \end{cases}$$

-continued $$l_L \max = \begin{cases} \alpha'_{L'i} + \beta'_{L'i}\, t_{\gamma'i} \max & (\beta'_{L'i} \geq 0) \\ \alpha'_{L'i} + \beta'_{L'i}\, t_{\gamma'i} \min & (\beta'_{L'i} < 0) \end{cases}$$

(iii) When there is no i which meets $L = L_i$ or $L = L_i$
$l_L \min = 0$
$l_L \max = l'_L$ The solution space of the Diophantus equation Dioph is approximated as follows by using $l_L$ min and $l_L$ max.

$l_L \min \leq l_L \leq l_L \max$ (L: all loops)

$l_L \min \leq l'_L \leq l_L \max$ (L: loops other than L and outer loops)

Step 505 has thus been explained.

In step 506, Indep is determined by using the approximation of the solution space of the Diophantus equation Dioph determined in step 505. Specifically, Indep is determined in the following manner. When $D = U-V'$, Indep is true only when $D \sim 0$ for any $l_L$ and $l'_L$ in the approximated solution space of the Diophantus equation determined in step 505. In step 507, Poseq is determined as a negative of Indep.

Steps 508, 509 and 512-515 are essentially same as the steps 503-507 and 511 and hence the explanation thereof is omitted.

Figure 6:
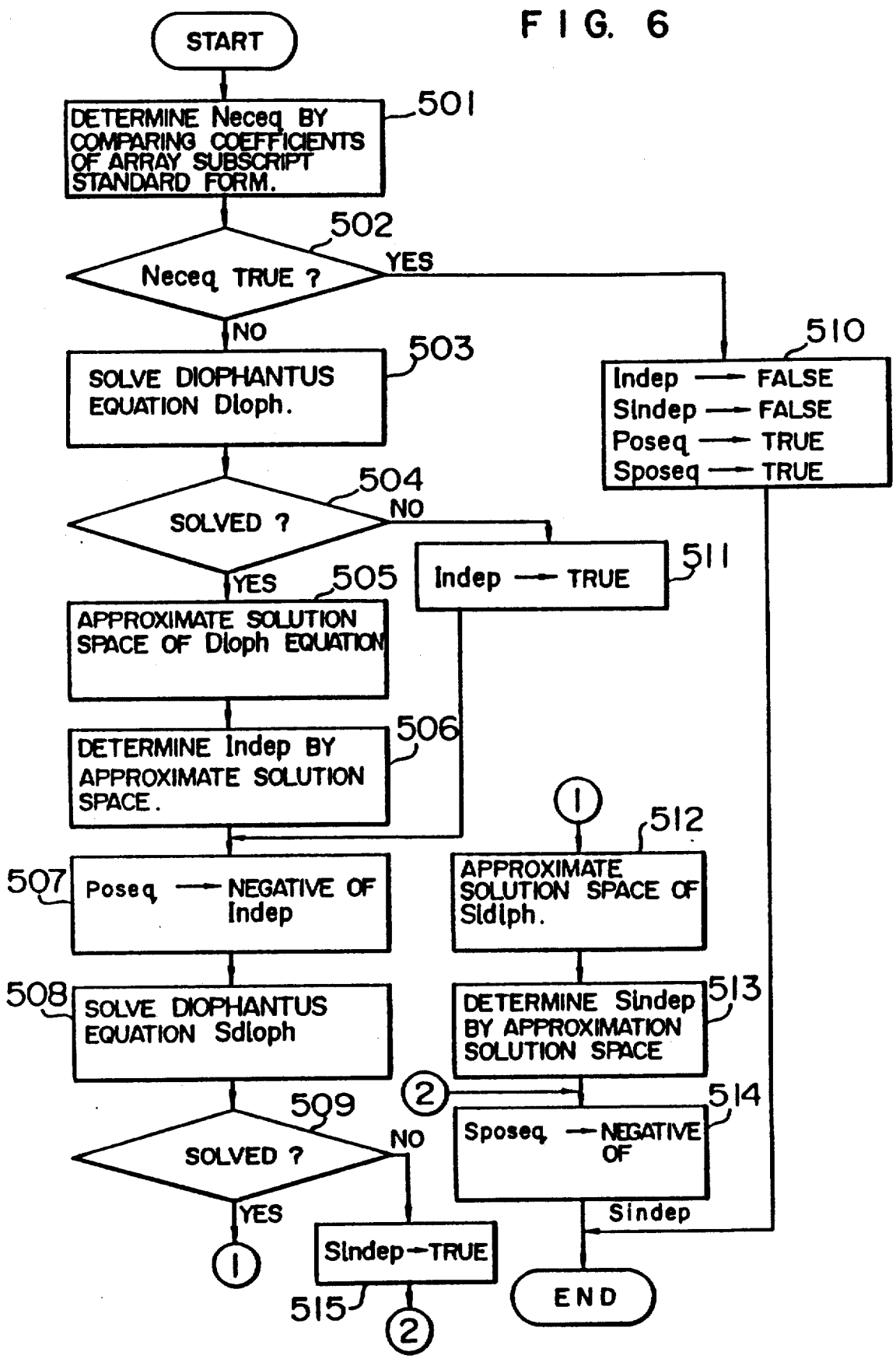
FIG. 6 shows a flow chart of an array subscript comparator.

The process of FIG. 6 is carried out for all arrays which appear in the loop. For example, in FIG. 7, it is carried out for d1 and U1, u1 and u2, and U2 and d1.

Thus, even if more than one definition formula of induction variables are included in the loop, the subscript (j) of the array (A(j)) can be analyzed by determining the standard form thereof, and the dependency of the data in the loop can be examined by checking the independency and dependency of the arrays.

The optimization unit 110 operates as follows. A vector processing function simultaneously processes the steps to be repeatedly carried out in the DO loop by one vector instruction. The optimization unit converts the inputted DO loop to vectorized object code. In this process, it is necessary that the data to be processed does not depend on other data but it is independent. If "independent" is outputted in the above process, it is assured that the data in the loop are independent from each other. Accordingly, one loop can be converted to one vector instruction by a known method. Thus, the loop which could not be analyzed in the prior art method can be analyzed in the present invention and more loops can be vector processed. As a result, the processing speed is increased.

When "Neceq" is produced, it indicates that two arrays in the loop regularly depend on each other. Thus, the operation register may be latched in a register at a certain iteration number and it may be converted to object code which is used during the circulation of the loop of that iteration or subsequent iteration. In this manner, high speed processing is attained.

In accordance with the present invention, the behavior of the array subscript which contains the induction variable having a plurality of increment steps (a plurality of difinition formulas) in the loop can be exactly analyzed. Thus, in the optimization process to the array such as vector processing or scalar-vector parallel processing, powerful optimization is attained by using the analysis information and the execution time of the object program can be shortened.

What is claimed is:

1. A method of operating a compiler for compiling a source program by analyzing independency and dependency of a plurality of arrays in loops of a source program for optimizing execution of the source program by a computer, said loop including an induction variable and the arrays having subscripts thereof defined by the induction variable, said method comprising:
   determining in the compiler whether said induction variable can be represented by an induction variable standard form having a form of $j = j + d$ where j is a variable having a constant initial value and d is a constant, and if so, defining and storing the induction variable standard form in a stored standard form;
   representing each of the subscripts of the arrays as a linear formula of said stored standard form by examining the subscript and replacing the induction variable defining the subscript with said stored standard form;
   deciding i) whether a pair of the subscripts thus represented of the arrays are independent of each other or whether one of the pair of subscripts is dependent on the other by comparing the pair of subscripts thus represented with each other based on an equality of the pair of subscripts for a common array at a kth iteration of the loop and a (k+n)th iteration of the loop and ii) whether a subscript of an array assumes a different value in any iteration of the loop and whether the subscript of the array assumes a repeated value in one or more iterations of the loop;
   repeating said deciding step for all array pairs in said loop; and,
   generating object program code when said one of the pair of subscripts is dependent on said other of said pair.

2. The method according to claim 1 further comprising determining in the compiler whether an induction variable defined by multiple assignments can be represented by a single assignment induction variable standard form.

3. A method of operating a data processing apparatus to compile source program code having multiple assignments to an induction variable within a single loop portion, the induction variable being used to reference an array pointer within the single loop portion, the method comprising the steps of:
   detecting the loop portion of the source program code stored in a memory of the apparatus;
   detecting induction variables within the loop portion and standardizing each of the detected induction variables as an induction variable standard form being a combination of an initial value assigned to the induction variable for an initial iteration of the loop portion, and an increment value by which the induction variable is incremented for iterations subsequent the initial iteration;
   detecting array pointers within the loop portion and standardizing each of the detected pointers as an array pointer standard form being a linear coupling of a constant with the induction variable standard form;
   comparing each of the induction variable standard forms with each of the array pointer standard forms for each iteration of the loop portion to determine an equivalence thereof; and,
   generating object program code having instructions which function to latch a value of an array element reference by an array pointer standard form into a buffer memory, when the equivalence is determined.

4. A method of operating a compiler for compiling a source program by analyzing independency and dependency of a plurality of arrays in loops of a source program for optimizing execution of the source program by a computer, said loop including multiple assignments of a basic induction variable j, where j is assigned by $j = j + d_1, j = j + d_2, \ldots, j = j + j_p$ in which $d_1, d_2, \ldots, d_p$ are constants, and the arrays having subscripts thereof defined by said basic induction variable j, said method comprising:

representing said basic induction variable j by a standard form having a form of $C_o + C_L I_L$ where $C_o$ is a constant initial value, $C_L$ is a constant increment, and $I_L$ is a standard induction variable having an initial value of 0 and an increment value of 1, $C_o$ and $C_L$ ($C_o, C_L$) being defined in such a manner as from a top of a loop body to a first assignment of the basic induction variable $j = j + d_1$, the standard form of j is defined $(j_0, \Sigma_{i=1,p} d_i)$ where $j_o$ is an initial value of the basic induction variable j at an entry of the loop, from the first assignment $j = j + d_1$ to a second assignment of the basic induction variable $j = j + d_2$, the standard form of j is defined $(j_o + d_1, \Sigma_{i=1,p} d_1), \ldots$ and from p-th assignment of the basic induction variable $j = j + d_p$ to the end of the loop body, the standard form of the basic induction variable j is defined $(j_o + \Sigma_{i=1,p} d_i, \Sigma_{i=1,p} d_i)$, and storing these standard forms;

representing each of the subscripts of the arrays as a linear formula of said stored standard form by examining the subscript and replacing the induction variable defining the subscript with said stored standard form;

deciding whether a pair of the subscripts thus represented of the arrays are independent of each other or whether one of the pair of subscripts is dependent on the other by comparing the pair of subscripts thus represented with each other based on an quality of the pair of subscripts for a common array at a kth iteration of the loop and a (k+n)th iteration of the loop;

repeating said deciding step for all array pairs in said loop; and, generating object program code when said pair of subscripts thus represented are dependent on each other.

5. The method according to claim 4 wherein said third step further comprises determining whether a subscript of an array assumes a different value in any iteration of the loop and whether the subscript of the array assumes a repeated value in one or more iterations of the loop.

6. The method according to claim 4 further comprising generating object program code having instructions which function to latch a value of an array element referenced by an array pointer standard form into a buffer memory, when the dependency is determined.

* * * * *

UNITED STATES PATENT AND TRADEMARK OFFICE
CERTIFICATE OF CORRECTION

PATENT NO. : 5,109,331
DATED : April 28, 1992
INVENTOR(S) : Kazuhisa Ishida, et al.

It is certified that error appears in the above-identified patent and that said Letters Patent is hereby corrected as shown below:

ON THE TITLE PAGE:

Item [54]: SYSTEM FOR COMPILING A SOURCE PROGRAM BY ANALYZING A SUBSCRIPT OF AN ARRAY INCLUDED IN A LOOP PROCESSING OF A COMPUTER Claim 1, column 8, line 26, delete "kth" and replace with --$k^{th}$--; and, delete "(k+n)th" and replace with --$(k+n)^{th}$--.

Claim 3, column 9, line 1, delete "reference" and replace with --referenced--.

Claim 4, column 9, line 10, delete "$j=j+d_1$, $j=j+d_2$, ..., $j=j+j_p$" and replace with --$j=j+d_1$, $j=j+d_2$, ..., $j=j+d_p$--.

Claim 4, column 9, line 22, delete "$(j_O, \Sigma_{i=1,p} d_i)$" and replace with --$(j_o, \Sigma_{i=1,p} d_i)$--.

Claim 4, column 10, line 13, delete "quality" and replace with --equality--.

Claim 4, column 10, line 14, delete "kth" and replace with --$k^{th}$--; and, delete "(k+n)th" and replace with --$(k+n)^{th}$--.

Signed and Sealed this

Eighth Day of June, 1993

Attest:

*Attesting Officer*

MICHAEL K. KIRK

*Acting Commissioner of Patents and Trademarks*